(12) United States Patent
Zhao

(10) Patent No.: US 9,937,700 B2
(45) Date of Patent: Apr. 10, 2018

(54) DISASSEMBLY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Tingting Zhao, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 38 days.

(21) Appl. No.: 15/106,033

(22) PCT Filed: Jan. 7, 2016

(86) PCT No.: PCT/CN2016/070326
§ 371 (c)(1),
(2) Date: Jun. 17, 2016

(87) PCT Pub. No.: WO2016/155402
PCT Pub. Date: Oct. 6, 2016

(65) Prior Publication Data
US 2017/0106644 A1 Apr. 20, 2017

(30) Foreign Application Priority Data
Apr. 3, 2015 (CN) .......................... 2015 1 0159011

(51) Int. Cl.
B32B 43/00 (2006.01)

(52) U.S. Cl.
CPC ...... *B32B 43/006* (2013.01); *B32B 2457/208* (2013.01); *Y10T 156/1111* (2015.01);
(Continued)

(58) Field of Classification Search
CPC ......... Y10T 156/1111; Y10T 156/1153; Y10T 156/1168; Y10T 156/1911; Y10T 156/1978; B32B 43/006
See application file for complete search history.

(56) References Cited

U.S. PATENT DOCUMENTS

| 8,443,864 B2 * | 5/2013 | Thallner | ........... H01L 21/67092 |
| | | | 156/703 |
| 9,437,468 B2 * | 9/2016 | Brun | ................... H01L 21/6838 |

(Continued)

FOREIGN PATENT DOCUMENTS

| CN | 103909722 A | 7/2014 |
| CN | 104097382 A | 10/2014 |

(Continued)

OTHER PUBLICATIONS

Form PCT/ISA/210 issued in corresponding international application No. PCT/CN2016/070326 dated Apr. 13, 2016.
(Continued)

*Primary Examiner* — Mark A Osele
(74) *Attorney, Agent, or Firm* — Nath, Goldberg & Meyer; Joshua B. Goldberg

(57) ABSTRACT

Disclosed is disassembly device for disassembling component such as touch display screen, the component comprising a first substrate and substrates which are arranged oppositely and between which adhesive is provided. The device comprises oppositely arranged two fixture mechanisms which fix the first substrate and the second substrate, respectively, and which can relatively move close to or away from each other. The device further comprises an adhesive processing mechanism, such that an adhesive force between the adhesive after processing and the first (and/or second) substrate is less than the adhesive force between the adhesive before processing and the first (and/or second) substrate. With the disassembly device according to the embodi-
(Continued)

ments of the disclosure, the mutually attached first substrate and second substrate can be efficiently disassembled without damaging the first substrate and the second substrate.

11 Claims, 2 Drawing Sheets

(52) U.S. Cl.
CPC .... *Y10T 156/1153* (2015.01); *Y10T 156/1168* (2015.01); *Y10T 156/1911* (2015.01); *Y10T 156/1978* (2015.01)

(56) References Cited

U.S. PATENT DOCUMENTS

| | | | |
|---|---|---|---|
| 2008/0302481 A1* | 12/2008 | Berger | B32B 37/06 |
| | | | 156/712 |
| 2012/0234497 A1 | 9/2012 | Han et al. | |
| 2012/0318463 A1* | 12/2012 | Anderson | B32B 17/10036 |
| | | | 156/712 |
| 2015/0004400 A1* | 1/2015 | Lilleland | H01L 21/67017 |
| | | | 428/332 |

FOREIGN PATENT DOCUMENTS

| | | | | |
|---|---|---|---|---|
| CN | 104129150 A | 11/2014 | | |
| CN | 104760400 A | 7/2015 | | |
| EP | 1523030 A2 * | 4/2005 | ....... | H01L 21/67132 |

OTHER PUBLICATIONS

Form PCT/ISA/220 issued in corresponding international application No. PCT/CN2016/070326 dated Apr. 13, 2016.
Form PCT/ISA/237 issued in corresponding international application No. PCT/CN2016/070326 dated Apr. 13, 2016.
Office action dated Mar. 29, 2016 for corresponding CN application No. 201510159011.9 with English translation attached.

* cited by examiner

DISASSEMBLY DEVICE

This is a National Phase Application filed under 35 U.S.C. 371 as a national stage of PCT/CN2016/070326, filed Jan. 7, 2016, an application claiming the benefit from the Chinese patent Application No. 201510159011.9, filed on Apr. 3, 2015, the content of each of which is hereby incorporated by reference in its entirety.

FIELD OF THE INVENTION

The disclosure relates to the field of display technologies, and in particular to a disassembly device for disassembling components such as touch screen.

BACKGROUND OF THE INVENTION

With the development of a variety of electronic equipments, a touch-screen display device (for example, a touch-screen computer, a touch-screen notebook, a touch-screen mobile phone, etc.) has been widely used in people's lives. A touch screen of the touch-screen display device generally includes a display panel and a cover attached to the display panel. Deficient products inevitably occur in the process of massive manufacture of the touch screens. It is required to disassemble the touch screen to separate the display panel and the cover when analyzing the deficient product.

Therefore, how to disassembly the touch screen without damaging the display panel and the cover becomes a technical problem urgently needed to be solved.

SUMMARY OF THE INVENTION

An object of this disclosure is to provide a disassembly device for disassembling a component such as touch display screen.

To achieve above objective, in the disclosure, there is provided a disassembly device for disassembling a component, the component comprising a first substrate and a second substrate which are arranged oppositely and between which an adhesive is provided. The disassembly device comprises oppositely arranged two fixture mechanisms which are configured to fix the first substrate and the second substrate, respectively, and which are able to relatively move close to or away from each other. The disassembly device further comprises an adhesive processing mechanism for processing the adhesive, such that an adhesive force between the adhesive after processing and the first substrate is less than the adhesive force between the adhesive before processing and the first substrate; and/or an adhesive force between the adhesive after processing and the second substrate is less than the adhesive force between the adhesive before processing and the second substrate.

Preferably, the fixture mechanism comprises a housing and suction cups disposed on the housing, and the suction cups are able to adsorb the first substrate and the second substrate.

Preferably, the adhesive processing mechanism is able to perform a cooling treatment on the adhesive, such that the adhesive is subjected to volume shrinkage.

Preferably, the adhesive processing mechanism comprises coolant contained in a chamber of the housing, and a side of the housing facing the first substrate or the second substrate is provided with outlets for outputting the coolant towards the component.

Preferably, the adhesive processing mechanism comprises a heating element for heating the adhesive.

Preferably, the heating element comprises heating wires mounted on the housing.

Preferably, the disassembly device further comprises a temperature detector for detecting temperature of the heating element.

Preferably, the disassembly device further comprises a temperature regulator which is connected to the temperature detector and the heating element, respectively, and which is configured to regulate the temperature of the heating element, until the temperature measured by the temperature detector reaches a preset temperature; and the preset temperature is the temperature at which the adhesive is transformed from the solid state to the colloidal state and which is determined by the type of the adhesive.

Preferably, the adhesive processing mechanism further comprises one or more solvent containers in which solvent capable of dissolving the adhesive is provided, and the solvent container is provided with one or more output pipes which are configured to output the solvent to the adhesive between the first substrate and the second substrate.

Preferably, the disassembly device further comprises:

a power source, which is configured to exert a pulling force on at least one of the fixture mechanisms, such that the two fixture mechanisms are able to relatively move away from each other;

a pulling force detector, which is configured to detect the pulling force received by the first substrate and/or the second substrate when the two fixture mechanisms relatively move away from each other; and a controller, which is connected to the power source and the pulling force detector, respectively, and which is configured to regulate the pulling force exerted by the power source until the pulling force detected by the pulling force detector reaches a preset pulling force, the preset pulling force being the pulling force at which the first substrate and the second substrate are just separated from each other.

According to the embodiments of the disclosure, the two fixture mechanisms can be fixed to the first substrate and the second substrate, respectively, and can relatively move away from or close to each other. When the two fixture mechanisms move away from each other, the first substrate and the second substrate can be driven to separate; further, the adhesive processing mechanism may process the adhesive by the cooling treatment, the heating treatment or dissolving solution treatment, so as to change the state of the adhesive. In such a manner, the adhesive force between the adhesive after processing and the first substrate is less than the adhesive force between the adhesive before processing and the first substrate, and/or the adhesive force between the adhesive after processing and the second substrate is less than the adhesive force between the adhesive before processing and the second substrate. With the disassembly device according to the embodiments of the disclosure, the first substrate and the second substrate can be efficiently disassembled without damaging the first substrate and the second substrate.

BRIEF DESCRIPTION OF THE DRAWINGS

Accompanying drawings are provided for further understanding of the disclosure and constituting a part of the specification. Hereinafter, these drawings are intended to explain the disclosure together with the following specific embodiments, but should not be considered as a limitation of the disclosure. In which.

DETAILED DESCRIPTION OF THE EMBODIMENTS

Hereinafter, specific embodiments of the disclosure will be described in detail in conjunction with the accompanying drawings. It should be understood that the specific embodiments as set forth herein are merely for the purpose of illustration and explanation of the disclosure and should not be constructed as a limitation thereof.

Figure 1:
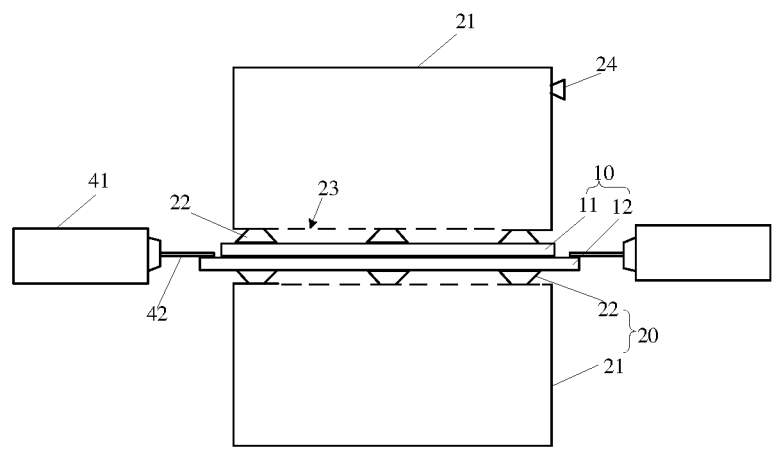
FIG. 1 is a schematic diagram illustrating a structure of a disassembly device according to an embodiment of the disclosure.

There is provided a disassembly device for disassembling a component such as a touch display screen in the disclosure. As shown in FIG. 1, a component 10 (such as, a touch display screen) may include a first substrate 11 and a second substrate 12 which are arranged oppositely and between which an adhesive is provided. The disassembly device may include oppositely arranged two fixture mechanisms 20 which are configured to fix the first substrate 11 and the second substrate 12, respectively, and which are able to relatively move close to or away from each other. The disassembly device may also include an adhesive processing mechanism for processing the adhesive, such that an adhesive force between the adhesive after processing and the first substrate 11 is less than the adhesive force between the adhesive before processing and the first substrate 11; and/or an adhesive force between the adhesive after processing and the second substrate is less than the adhesive force between the adhesive before processing and the second substrate 12.

In the disclosure, as described above, the two fixture mechanisms 20 can be used to fix the first substrate 11 and the second substrate 12, respectively. When the two fixture mechanisms 20 relatively move away from each other, the first substrate 11 and the second substrate 12 can be driven to move away from each other. Before the two fixture mechanisms 20 relatively move away from each other, the adhesive processing mechanism may process the adhesive, such that the adhesive force between the adhesive after processing and the first substrate 11 (and/or the second substrate 12) is less than the adhesive force between the adhesive before processing and the first substrate 11 (and/or the second substrate 12). In other words, the adhesive force between the first substrate 11 and the second substrate 12 is reduced. At this point, when the two fixture mechanisms 20 relatively move away from each other, the first substrate 11 and the second substrate 12 tend to separate without damaging the first substrate 11 and the second substrate 12, such that the disassembly between the first substrate 11 and the second substrate 12 is effectively achieved.

Figure 2:
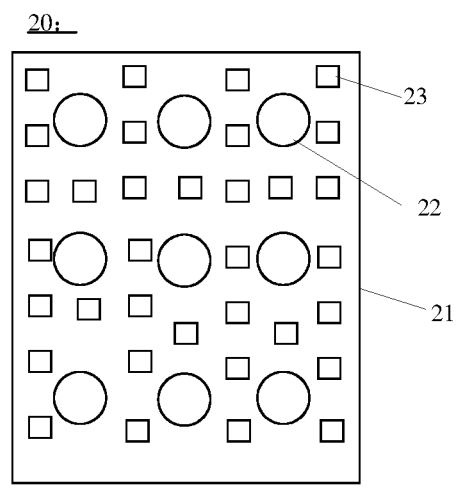
FIG. 2 is a top plan view illustrating an inside of one of fixture mechanisms according to the embodiment of the disclosure.

The structure of the fixture mechanism 20 is not specifically limited herein. In one example, as shown in FIG. 1 and FIG. 2, the fixture mechanism 20 may include a housing 21 and suction cups 22 disposed on the housing 21. The suction cups 22 can adsorb the first substrate 11 and the second substrate 12. Herein, the suction cups could be vacuum cups. Accordingly, pumping channels corresponding to respective vacuum cups may be provided in the housing 21. The pumping channels may be communicated with an external air extractor. The housing 21 may be mounted to and move along rails, such that the two fixture mechanism 20 can relatively move away from or close to each other.

In the disassembly device according to disclosure, as described above, the adhesive processing mechanism can cause the adhesive force between the adhesive after processing and the first substrate to be less than the adhesive force between the adhesive before processing and the first substrate; and/or the adhesive force between the adhesive after processing and the second substrate to be less than the adhesive force between the adhesive before the second substrate.

As a first specific embodiment of the disclosure, the adhesive processing mechanism can perform a cooling treatment on the adhesive, such that the adhesive is subjected to volume shrinkage. It should be understood that the first substrate 11 and the second substrate 12 may also shrink due to low temperature when the adhesive is cooled. Therefore, it is necessary to select an appropriate cooling temperature when performing the cooling treatment, such that the adhesive force between the adhesive after cooling and the first substrate 11 (and/or the second substrate 12) is less than the adhesive force between the adhesive before cooling and the first substrate 11 (and/or second substrate 12), while there is no damage on the first substrate 11 and the second substrate 12.

In particular, the adhesive processing mechanism may include coolant contained in a chamber of the housing 21. As shown in FIG. 1 and FIG. 2, an inside of the housing 21 (i.e., a side facing the first substrate 11 or the second substrate 12) is provided with outlets 23 for outputting the coolant towards the component 10. As shown in FIG. 1, the two fixture mechanisms are used to fix the first substrate 11 and the second substrate 12 via the suction cups 22, respectively. When the fixture mechanisms fix the first substrate 11 and the second substrate 12 via the suction cups 22, the coolant may be dripped or sprayed onto the first substrate 11 or the second substrate 12 via the outlets 23.

It is readily appreciated that the housing 21 may also be provided with an inlet 24 for supplementing the coolant. As shown in FIG. 1 and FIG. 2, outlets 23 and suction cups 22 are separately arranged on the housing 21, such that they could not interfere with each other. The type of coolant is not specifically limited in the disclosure, as long as it can cool the adhesive. For example, the coolant could be liquid nitrogen.

Figure 3:
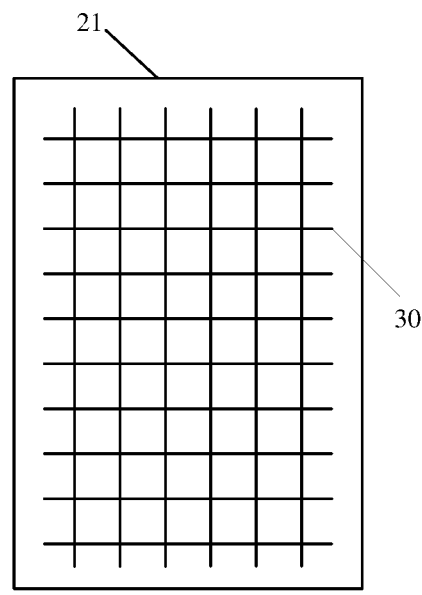
FIG. 3 is a schematic diagram illustrating a structure of a heating member according to the embodiment of the disclosure.

As a second specific embodiment of the disclosure, as shown in FIG. 3, the adhesive processing mechanism may include a heating element for heating the adhesive. When the adhesive is heated to a certain temperature, the adhesive is transformed from solid state to colloidal state, such that the adhesive force between the colloidal adhesive and the first substrate/second substrate is less than the adhesive force between the solid adhesive and the first substrate/second substrate.

In particular, as shown in FIG. 3, the heating element could be heating wires 30 mounted on the housing. Heat generated from the heating wires 30 can be transferred to the component 10, such that the heated adhesive is transformed from the solid state to the colloidal state.

Further, the disassembly device may include a temperature detector for detecting temperature of the heating element. In practical operations, the temperature detector can be used to monitor the temperature of the heating element in real time. When the temperature of the heating element transforms the adhesive from the solid state to the colloidal state, the temperature of the heating element is kept.

Furthermore, the disassembly device may include a temperature regulator which is connected to the temperature detector and the heating element, respectively, and which is configured to regulate the temperature of the heating element, until the temperature measured by the temperature detector reaches a preset temperature.

The preset temperature is the temperature at which the adhesive is transformed from the solid state to the colloidal state. The preset temperature may be determined by an experimental manner. When the temperature of the component does not reach the preset temperature, the temperature regulator can cause the heating element to continuously heat, until the temperature of the component reaches the preset temperature. In such a manner, the disassembling efficiency can be improved, while the first substrate and the second substrate of the component can be prevented from damaging due to overheating.

For different types of components, the type of the adhesive between the first substrate and the second substrate may be different. It is readily understood that the preset temperature can be set in accordance with the practical type of the adhesive.

It should be explained that the adhesive processing mechanism may include both the coolant for cooling the adhesive and the heating element for heating the adhesive. However, the cooling treatment and the heating treatment cannot be performed at the same time. In other words, when the coolant is used to cool the adhesive, the heating of the heating element is stopped; and when the heating element is used to heat the adhesive, the outputting of the coolant is stopped.

Figure 4:
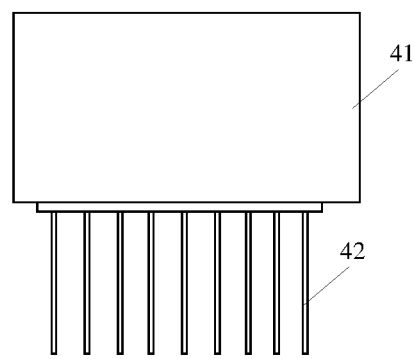
FIG. 4 is a schematic diagram illustrating a structure of a dissolving solution chamber according to the embodiment of the disclosure.

As a third specific embodiment of the disclosure, as shown in FIG. 1 and FIG. 4, the adhesive processing mechanism may include one or more solvent containers 41 in which solvent capable of dissolving the adhesive is provided. The solvent container 41 can be provided with one or more output pipes 42 which are configured to output the solvent to the adhesive between the first substrate 11 and the second substrate 12. For example, the solvent could be ethyl alcohol, acetone, etc. The output pipes 42 of the solvent container 41 may output solvent to the adhesive from various sides of the component 10, respectively, such that the adhesive can be dissolved by the solvent. According to this embodiment, the adhesive force between the adhesive after dissolving and the first substrate 11 (and/or the second substrate 12) is less than the adhesive force between the adhesive before dissolving and the first substrate 11 (and/or the second substrate 12).

In the disassembly device according to the disclosure, the adhesive processing mechanism may include one or more of the coolant, the heating wires and the solvent container. For example, in practice, it is possible to select the cooling treatment by the coolant, the heating treatment by the heating wires or the dissolving treatment by the solvent in accordance with the specific types of the adhesive. In some cases, it is possible to combine the cooling treatment by the coolant or the heating treatment by the heating wires with the dissolving treatment by the solvent.

Furthermore, the disassembly device may include:

a power source (for example, electrical motor) which is configured to exert a pulling force on at least one of the fixture mechanisms 20 such that the two fixture mechanisms 20 are able to relatively move away from each other; and when the power source exerts the pulling force on one of the fixture mechanisms 20, the other fixture mechanism 20 can be fixed on an installation base;

a pulling force detector which is configured to detect the pulling force received by the first substrate 11 and/or the second substrate 12 when the two fixture mechanisms 20 relatively move away from each other; and a controller which is connected to the power source and the pulling force detector, respectively, and which is configured to regulate the pulling force exerted by the power source until the pulling force detected by the pulling force detector reaches a preset pulling force.

It should be understood that in the initial phrase wherein the first substrate 11 and the second substrate 12 are attached by the adhesive, the first substrate 11 and the second substrate 12 receive the same pulling force. As the pulling force increases and reaches the preset pulling force, the first substrate 11 and the second substrate 12 are just separated from each other. At this point, the controller can control the power source to stop exerting the pulling force. In such a manner, an automatic control can be achieved while improving the disassembling efficiency.

In the case that the component is a touch display screen, the first substrate could be a cover of the touch screen or the touch display screen, while the second substrate could be an upper substrate attached to the cover in a display panel.

As could be seen from the description of the disassembly device according to the disclosure, the two fixture mechanisms can fix the first substrate and the second substrate, respectively, and can relatively move away from or close to each other. When the two fixture mechanisms move away from each other, the first substrate and the second substrate can be driven to separate; further, the adhesive processing mechanism may process the adhesive by the cooling treatment, the heating treatment or dissolving solution treatment, so as to change the state of the adhesive. In such a manner, the adhesive force between the adhesive after processing and the first substrate is less than the adhesive force between the adhesive before processing and the first substrate, and/or the adhesive force between the adhesive after processing and the second substrate is less than the adhesive force between the adhesive before processing and the second substrate. With the disassembly device according to the embodiments of the disclosure, the first substrate and the second substrate can be efficiently disassembled without damaging the first substrate and the second substrate.

It should be understood that the above implementations are merely exemplary embodiments for the purpose of illustrating the principle of the disclosure, and the disclosure is not limited thereto. Various modifications and improvements can be made by a person having ordinary skill in the art without departing from the spirit and the essence of the disclosure. Accordingly, all of the modifications and improvements also fall into the protection scope of the disclosure.

The invention claimed is:

1. A disassembly device for disassembling a component, the component comprising a first substrate and a second substrate which are arranged oppositely and between which an adhesive is provided, wherein, the disassembly device comprises oppositely arranged two fixture mechanisms which are configured to fix the first substrate and the second substrate, respectively, and which are able to relatively move close to or away from each other, each fixture mechanism comprises a housing and suction cups disposed on the housing, and the suction cups are able to adsorb the first substrate and the second substrate, the disassembly device further comprises an adhesive processing mechanism for processing the adhesive, such that an adhesive force between the adhesive after processing and the first substrate is less than the adhesive force between the adhesive before processing and the first substrate; and/or an adhesive force between the adhesive after processing and the second substrate is less than the adhesive force between the adhesive before processing and the second substrate, and the adhesive processing mechanism comprises coolant contained in a chamber of the housing, and a side of the housing facing the first substrate or the second substrate is provided with outlets for outputting the coolant towards the component.

2. The disassembly device according to claim 1, wherein the adhesive processing mechanism is able to perform a cooling treatment on the adhesive, such that the adhesive is subjected to volume shrinkage.

3. The disassembly device according to claim 2, wherein the adhesive processing mechanism comprises a heating element for heating the adhesive.

4. The disassembly device according to claim 2, wherein the adhesive processing mechanism further comprises one or more solvent containers in which solvent capable of dissolving the adhesive is provided, and the solvent container is provided with one or more output pipes which are configured to output the solvent to the adhesive between the first substrate and the second substrate.

5. The disassembly device according to claim 2, wherein, the disassembly device further comprises:

a power source which is configured to exert a pulling force on at least one of the fixture mechanisms such that the two fixture mechanisms are able to relatively move away from each other;

a pulling force detector which is configured to detect the pulling force received by the first substrate and/or the second substrate when the two fixture mechanisms relatively move away from each other; and a controller which is connected to the power source and the pulling force detector, respectively, and which is configured to regulate the pulling force exerted by the power source until the pulling force detected by the pulling force detector reaches a preset pulling force, the preset pulling force being the pulling force at which the first substrate and the second substrate are just separated from each other.

6. The disassembly device according to claim 1, wherein the adhesive processing mechanism comprises a heating element for heating the adhesive.

7. The disassembly device according to claim 6, wherein the heating element comprises heating wires mounted on the housing.

8. The disassembly device according to claim 6, wherein the disassembly device further comprises a temperature detector for detecting temperature of the heating element.

9. The disassembly device according to claim 8, wherein the disassembly device further comprises a temperature regulator which is connected to the temperature detector and the heating element, respectively, and which is configured to regulate the temperature of the heating element, until the temperature measured by the temperature detector reaches a preset temperature; and the preset temperature is the temperature at which the adhesive is transformed from the solid state to the colloidal state and which is determined by the type of the adhesive.

10. The disassembly device according to claim 1, wherein the adhesive processing mechanism further comprises one or more solvent containers in which solvent capable of dissolving the adhesive is provided, and the solvent container is provided with one or more output pipes which are configured to output the solvent to the adhesive between the first substrate and the second substrate.

11. The disassembly device according to claim 1, wherein, the disassembly device further comprises:

a power source which is configured to exert a pulling force on at least one of the fixture mechanisms such that the two fixture mechanisms are able to relatively move away from each other;

a pulling force detector which is configured to detect the pulling force received by the first substrate and/or the second substrate when the two fixture mechanisms relatively move away from each other; and a controller which is connected to the power source and the pulling force detector, respectively, and which is configured to regulate the pulling force exerted by the power source until the pulling force detected by the pulling force detector reaches a preset pulling force, the preset pulling force being the pulling force at which the first substrate and the second substrate are just separated from each other.

* * * * *